(12) United States Patent
Kim

(10) Patent No.: US 12,179,839 B2
(45) Date of Patent: Dec. 31, 2024

(54) DRIVING ASSISTANCE APPARATUS AND METHOD

(71) Applicants: Hyundai Motor Company, Seoul (KR); Kia Corporation, Seoul (KR)

(72) Inventor: Yun Sik Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 289 days.

(21) Appl. No.: 17/806,536

(22) Filed: Jun. 13, 2022

(65) Prior Publication Data
US 2023/0219621 A1      Jul. 13, 2023

(30) Foreign Application Priority Data

Jan. 10, 2022   (KR) ........................ 10-2022-0003174

(51) Int. Cl.

| | |
|---|---|
| *B62D 15/02* | (2006.01) |
| *B60K 35/00* | (2006.01) |
| *B60K 35/23* | (2024.01) |
| *B62D 5/04* | (2006.01) |
| *B62D 6/00* | (2006.01) |
| *B60K 35/28* | (2024.01) |

(52) U.S. Cl.
CPC ............ *B62D 15/028* (2013.01); *B60K 35/00* (2013.01); *B62D 5/0481* (2013.01); *B62D 6/002* (2013.01); *B60K 35/23* (2024.01); *B60K 35/28* (2024.01); *B60K 2360/166* (2024.01)

(58) Field of Classification Search
CPC .... B62D 15/028; B62D 5/0481; B62D 6/002; B62D 15/027; B62D 15/0275; B62D 15/029; B62D 15/0295; B60K 35/00; B60K 35/28; B60K 35/23; B60K 2360/166
See application file for complete search history.

(56) References Cited

U.S. PATENT DOCUMENTS

| | | | |
|---|---|---|---|
| 2017/0274931 A1* | 9/2017 | Yang ....................... | B60K 35/00 |
| 2019/0144037 A1* | 5/2019 | Yoshimura ............... | G08G 1/16 |
| | | | 701/34.4 |

\* cited by examiner

*Primary Examiner* — Jacob M Amick
(74) *Attorney, Agent, or Firm* — Slater Matsil, LLP

(57) ABSTRACT

An embodiment driving assistance apparatus includes a sensor unit configured to search surroundings of a vehicle using one or more sensors, a steering device configured to control a traveling direction of the vehicle, a control unit configured to calculate a target trajectory of the vehicle using searching information received from the sensor unit and to calculate an expected trajectory of the vehicle based on a steering angle of the steering device, and an output unit configured to display the target trajectory and the expected trajectory for a driver, the display designed to assist a steering operation of the driver.

18 Claims, 6 Drawing Sheets

DRIVING ASSISTANCE APPARATUS AND METHOD

CROSS-REFERENCE TO RELATED APPLICATIONS

This application claims the benefit of Korean Patent Application No. 10-2022-0003174, filed on Jan. 10, 2022, which application is hereby incorporated herein by reference.

TECHNICAL FIELD

The present disclosure relates to a driving assistance apparatus and method.

BACKGROUND

The content described in the background section of the present disclosure merely provides background information for the present disclosure and does not constitute the prior art.

A vehicle is equipped with an advanced driver assistance system (ADAS). The vehicle may use the ADAS to analyze a condition of a driver and surrounding circumstances, secure visibility, display a screen, and provide guidance, warning, and a control.

As functions of the ADAS, there are a blind-spot collision avoidance (BCA) function, a rear cross-traffic collision warning (RCCW) function, a safe exit assist (SEA) function, a parking collision-avoidance assist (PCA) function, and a remote parking pilot (RPP) function.

In order to perform the ADAS functions, the vehicle may include advanced control units and sensors. By using advanced control units and sensors, it is possible to easily calculate a route of the vehicle when the vehicle travels or is parked. In addition, it is possible to determine a collision with a nearby static or dynamic object and design an avoidance driving plan according to the determination result.

However, despite technological advances, there are technological or regulatory limitations to the introduction of a fully autonomous driving system. In a situation of manual driving rather than of a partially autonomous vehicle, a novice driver may have difficulty accurately calculating whether the outer part of the vehicle collides with surrounding obstacles or the like when controlling the steering. Therefore, there is a problem in controlling a steering angle of a vehicle when parking in a narrow space or driving on a narrow road.

SUMMARY

According to at least one embodiment, the present disclosure provides a driving assistance apparatus comprising a sensor unit configured to search surroundings of a vehicle using one or more sensors to generate searching information, a steering device configured to control a traveling direction of the vehicle, a control unit configured to calculate a target trajectory of the vehicle using the searching information and calculate an expected trajectory of the vehicle based on a steering angle of the steering device, and an output unit configured to display the target trajectory and the expected trajectory for a driver to assist a steering change of the driver.

According to at least one embodiment, the present disclosure provides a driving assistance method comprising searching surroundings of a vehicle using one or more sensors to generate searching information, calculating a target trajectory of the vehicle using the searching information, calculating an expected trajectory of the vehicle based on a steering angle of the steering device, and displaying the target trajectory and the expected trajectory for a driver to assist a steering change of the driver.

DETAILED DESCRIPTION OF ILLUSTRATIVE EMBODIMENTS

Figure 1:
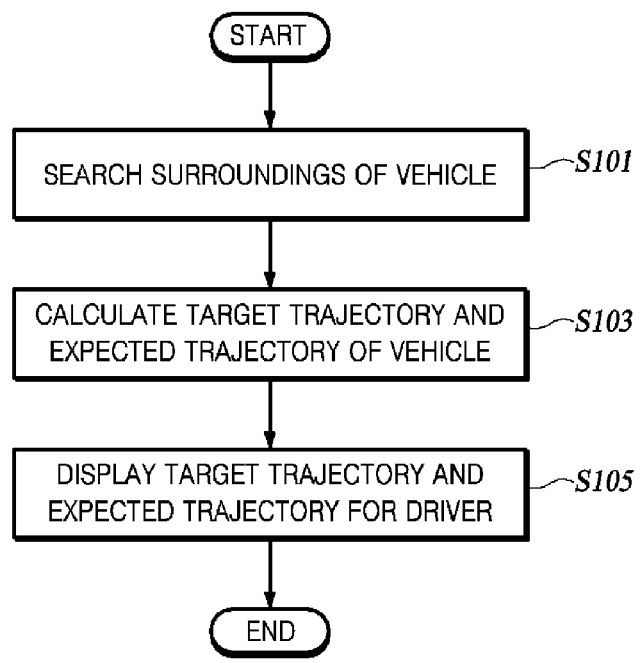
FIG. 1 is a flowchart of a driving assistance method according to one embodiment of the present disclosure.

The driving assistance apparatus according to an embodiment may assist a novice driver in driving by using a sensor unit, a control unit, and an output unit attached to a vehicle.

The problems solvable by embodiments of the present disclosure are not limited to the problems mentioned above, and other problems not mentioned will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or the sequence of the components. Throughout this specification, when parts "include" or "comprise" a component, they are meant to further include other components, not excluding thereof unless there is a particular description contrary thereto.

FIG. 1 is a flowchart of a driving assistance method according to one embodiment of the present disclosure.

A driving assistance apparatus according to one embodiment of the present disclosure may include all or some of a sensor unit, a steering device, a control unit, and an output unit.

Referring to FIG. 1, the driving assistance apparatus according to one embodiment of the present disclosure may search the surroundings of a vehicle using the sensor unit (S101). The sensor unit may include a camera and an ultrasonic sensor. In a parking situation, the sensor unit may search an obstacle and a target parking space by searching the surroundings of the vehicle. In a driving situation, the sensor unit may search an obstacle and a driving trajectory of the vehicle by searching the surroundings of the vehicle.

The control unit may calculate a target trajectory and an expected trajectory of the vehicle (S103). Using the information about the vehicle surroundings searched by the sensor unit, the control unit may calculate the target trajectory of the vehicle. In a situation where the vehicle is parked, the target trajectory refers to a trajectory that can guide the vehicle to park in the target parking space without colliding with obstacles around the vehicle. Meanwhile, in a driving situation, the target trajectory refers to a trajectory that can guide the vehicle to drive without colliding with obstacles around the vehicle.

Using a steering angle of a steering device, the control unit may calculate the expected trajectory of the vehicle. The expected trajectory means a trajectory on which the vehicle is expected to move when the vehicle is controlled based on the current steering angle of the steering device. The expected trajectory may be continuously changed as the steering angle is changed. That is, the control unit may continuously calculate the expected trajectory by reflecting the movement of the steering angle in real time.

The output unit of the driving assistance apparatus may display the target trajectory and the expected trajectory to the driver (S105). The output unit may include a surround view monitor (SVM) and a head-up display (HUD). The output unit may display the target trajectory and the expected trajectory to the driver. The SVM may assist the driving by displaying the target trajectory as a plane and displaying the expected trajectory as a line. The HUD may visually present a virtual steering wheel 31, a steering assistance unit 33, and a steering guide unit 35 to the driver (see, e.g., FIG. 3A). The contents displayed on the SVM and the HUD will be described in detail below.

Figure 2A:
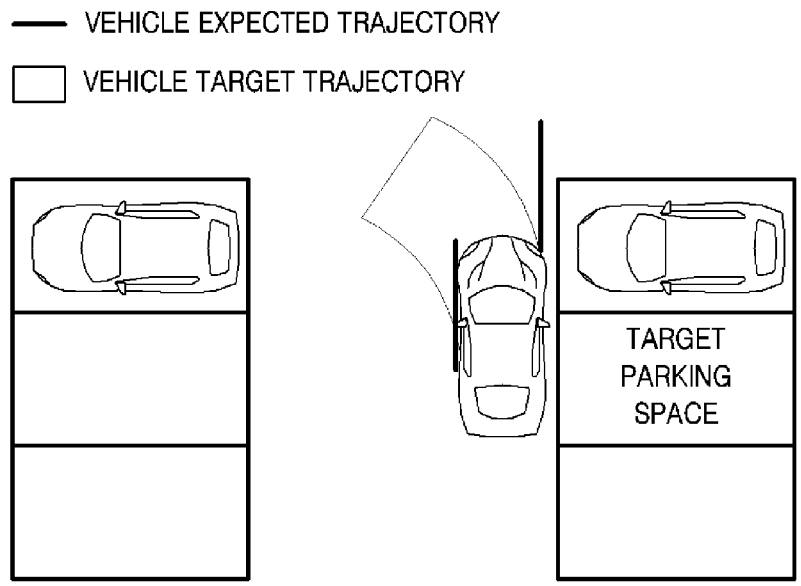
FIGS. 2A and 2B are diagrams illustrating a surround view monitor (SVM) of a driving assistance apparatus in a parking situation according to one embodiment of the present disclosure.
Figure 2B:
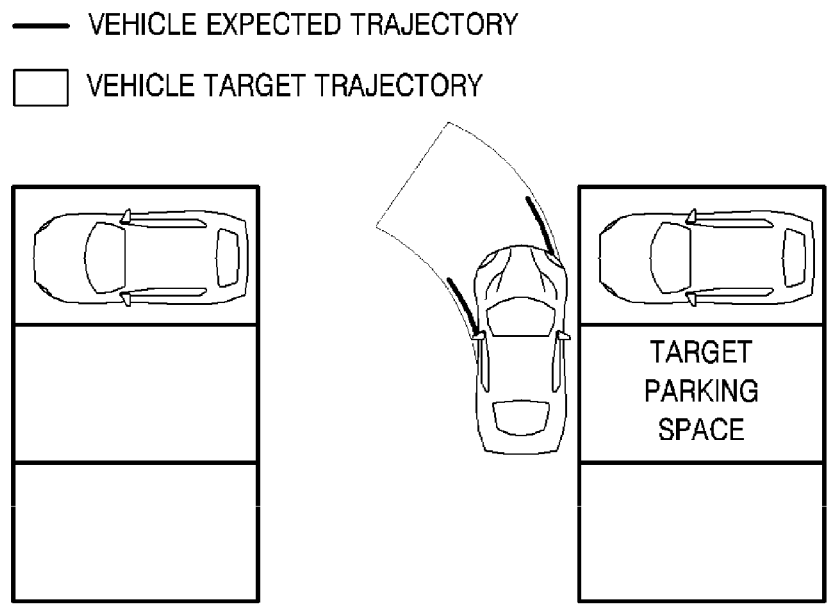

FIGS. 2A and 2B are diagrams illustrating the SVM of a driving assistance apparatus in a parking situation according to one embodiment of the present disclosure.

Referring to FIGS. 2A and 2B, the SVM may display a target parking space, a target trajectory, and an expected trajectory of the vehicle to the driver. The SVM may display the target trajectory as a plane and the expected trajectory as a line. The SVM may display the target trajectory as a two-dimensional surface, and display the expected trajectory as a line by overlapping the target trajectory.

FIG. 2A is a diagram illustrating a case where the target trajectory and the expected trajectory do not match with each other. When it is determined that a target trajectory (thin line) for parking the vehicle in the target parking space and an expected trajectory (thick line) according to a current steering angle do not match with each other, the expected trajectory may be displayed in a red line to induce the steering operation of the driver.

FIG. 2B is a diagram illustrating a case where the target trajectory and the expected trajectory match with each other. When the target trajectory (thin line) for parking the vehicle in the target parking space matches with the expected trajectory (thick line) according to the current steering angle, the expected trajectory may be displayed as a green line and visually presented to the driver. However, the shapes of the target trajectory and the expected trajectory, and the colors of the lines are not limited thereto, and may be set variously according to circumstances.

Figure 3A:
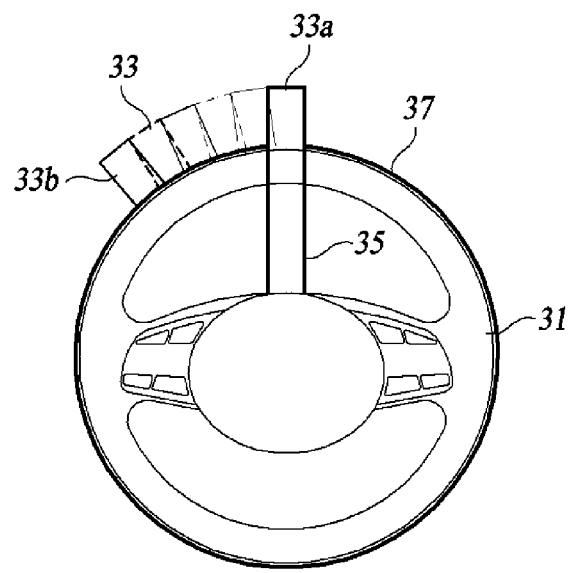
FIGS. 3A and 3B are diagrams illustrating a head-up display (HUD) of the driving assistance apparatus according to one embodiment of the present disclosure.
Figure 3B:
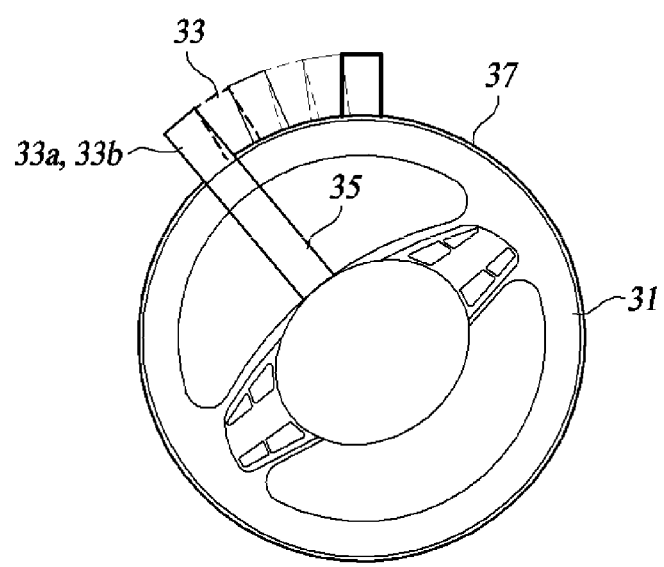

FIGS. 3A and 3B are diagrams illustrating the HUD of the driving assistance apparatus according to one embodiment of the present disclosure.

Referring to FIGS. 3A and 3B, the HUD may display the virtual steering wheel 31, the steering assistance unit 33, and the steering guide unit 35. The virtual steering wheel 31 may be displayed similarly to a steering device of a real vehicle.

The steering assistance unit 33 may be displayed on the outside of the virtual steering wheel 31 in the form of a gradient color bar. The steering assistance unit 33 may indicate current steering 33a and target steering 33b. The steering assistance unit 33 may perform display from the current steering 33a to the target steering 33b in the form of a gradient color bar in order to guide the vehicle along the target trajectory from the current steering 33a of the vehicle.

The steering guide unit 35 may be displayed in the form of a vertical bar connected to the steering assistance unit 33 to indicate the current steering of the vehicle. The steering guide unit 35 rotates according to the steering angle of the steering device of the vehicle, and the same color as the color of the connected steering assistance unit 33 may be displayed.

FIG. 3A is a diagram illustrating a case where the current steering 33a and the target steering 33b do not match with each other. The steering guide unit 35 may be connected to the current steering 33a of the steering assistance unit 33. The steering guide unit 35 and the current steering 33a may be displayed in the same color, and the target steering 33b may be displayed in different colors to induce the driver to control the steering device to the target steering 33b. For example, the steering guide unit 35 and the current steering 33a may be displayed in red, and the target steering 33b may be displayed in green. Moreover, when the current steering 33a and the target steering 33b do not match with each other, a light 37 surrounding the outside of the virtual steering wheel 31 may be displayed in red.

FIG. 3B is a diagram illustrating a case where the current steering 33a and the target steering 33b match with each other. The steering guide unit 35 may be connected to or overlap with the current steering 33a and the target steering 33b of the steering assistance unit 33. The steering guide unit 35, the current steering 33a, and the target steering 33b may be displayed in the same color. For example, the steering guide unit 35, the current steering 33a and the target steering 33b may be displayed in green. Moreover, when the current steering 33a and the target steering 33b match with each other, the light 37 surrounding the outside of the virtual steering wheel 31 may be displayed in green.

Figure 4A:
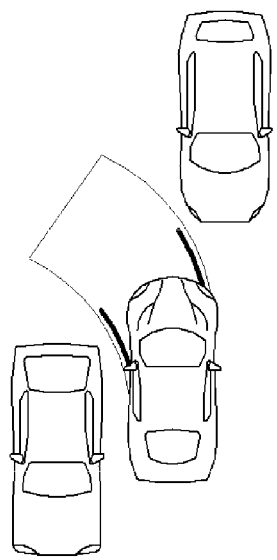
FIGS. 4A and 4B are diagrams illustrating the SVM and the HUD after an output unit guides left steering in a driving situation and a driver completes the steering.
Figure 4B:
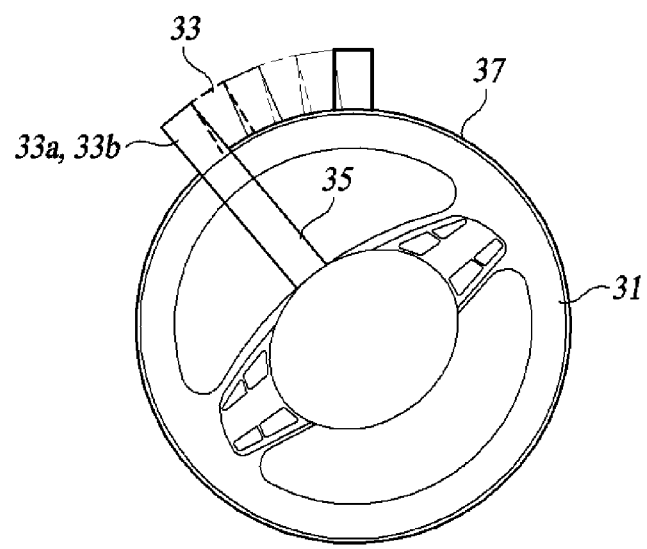

FIGS. 4A and 4B are diagrams illustrating the SVM and the HUD after the output unit guides left steering in a driving situation and the driver completes the steering.

Figure 5A:
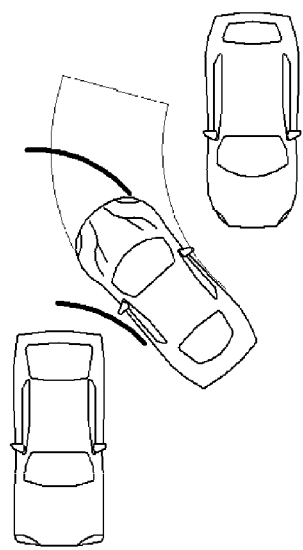
FIGS. 5A and 5B are diagrams illustrating the SVM and the HUD before the driver completes the steering after the output unit guides right steering in the driving situation.
Figure 5B:
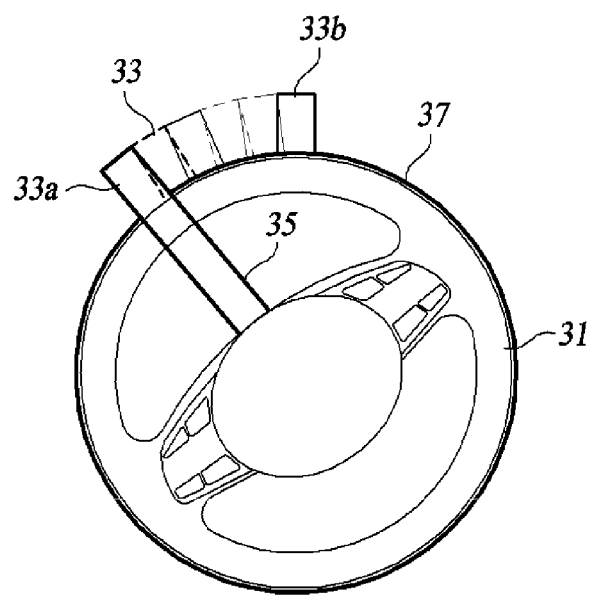

FIGS. 5A and 5B are diagrams illustrating the SVM and the HUD before the driver completes the steering after the output unit guides right steering in the driving situation.

Figure 6A:
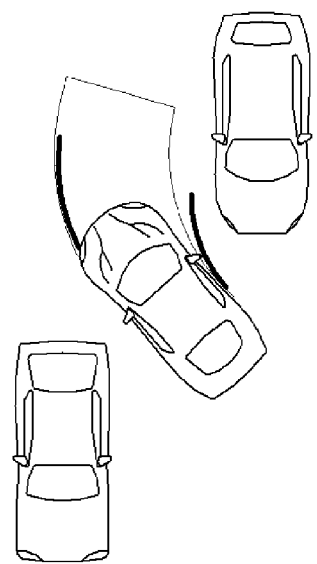
FIGS. 6A and 6B are diagrams illustrating the SVM and the HUD after the output unit guides the right steering in the driving situation and the driver completes the steering.
Figure 6B:
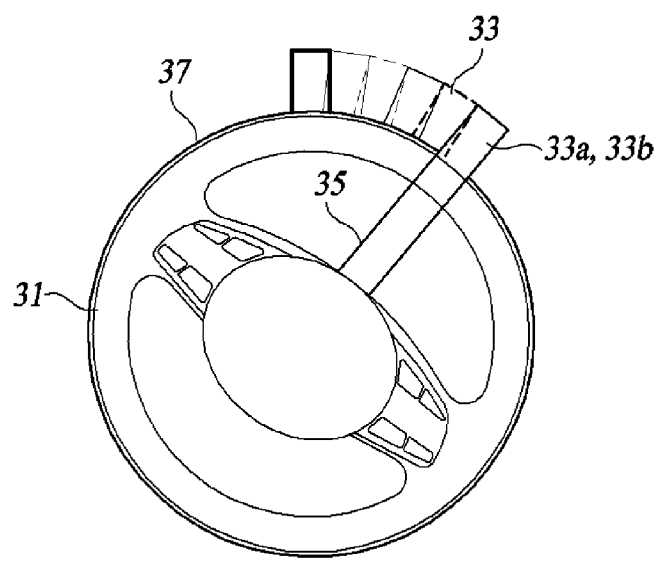

FIGS. 6A and 6B are diagrams illustrating the SVM and the HUD after the output unit guides the right steering in the driving situation and the driver completes the steering.

Referring to FIGS. 4A to 6B, according to a change in the steering angle of the steering device, the output unit may continuously display the target trajectory to assist the driver in driving.

Referring to FIG. 4A, the SVM may display in an overlapping manner that the expected trajectory of the vehicle with the target trajectory thereof. The SVM may indicate to the driver that driving is possible by displaying the expected trajectory as a green line.

Referring to FIG. 4B, the HUD may display that the current steering 33*a* of the vehicle matches with the target steering 33*b*. Accordingly, the steering guide unit 35, the current steering 33*a*, and the target steering 33*b* may be displayed in green, and at the same time, the light 37 surrounding the outside of the virtual steering wheel 31 may be displayed in green to inform the driver that driving is possible.

Referring to FIG. 5A, the SVM may display that the expected trajectory of the vehicle does not match with the target trajectory. The SVM may indicate to the driver that driving is not possible by displaying the expected trajectory as a red line.

Referring to FIG. 5B, the HUD may display that the current steering 33*a* of the vehicle does not match with the target steering 33*b*. When the current steering 33*a* of the vehicle does not match with the target steering 33*b*, the steering guide unit 35 and the current steering 33*a* may be displayed in red, and the target steering 33*b* may be displayed in green. The light 37 surrounding the outside of the virtual steering wheel 31 may be displayed in red to indicate to the driver that driving is impossible.

Referring to FIG. 6A, the SVM may display in an overlapping manner that the expected trajectory of the vehicle matches with the target trajectory thereof. The SVM may indicate to the driver that driving is possible by displaying the expected trajectory as a green line.

Referring to FIG. 6B, the HUD may display that the current steering 33*a* of the vehicle matches with the target steering 33*b*. Accordingly, the steering guide unit 35, the current steering 33*a*, and the target steering 33*b* may be displayed in green, and at the same time, the light 37 surrounding the outside of the virtual steering wheel 31 may be displayed in green to inform the driver that driving is possible.

According to one embodiment, the driving assistance apparatus has an effect of assisting a novice driver in driving by intuitively displaying a steering control range using the sensor unit, the control unit, and the output unit attached to a vehicle.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A driving assistance apparatus comprising:
   a sensor unit configured to search surroundings of a vehicle using one or more sensors;
   a steering device configured to control a traveling direction of the vehicle;
   a control unit configured to calculate a target trajectory of the vehicle using searching information received from the sensor unit and to calculate an expected trajectory of the vehicle based on a steering angle of the steering device; and
   a head-up display (HUD) configured to display the target trajectory and the expected trajectory for a driver, the display designed to assist a steering operation of the driver, wherein the HUD comprises:
   a virtual steering wheel;
   a steering assistance unit displayed outside of the virtual steering wheel and configured as a gradient bar to visually guide from current steering to target steering of the vehicle in order to guide the vehicle along the target trajectory from the current steering of the vehicle; and
   a steering guide unit displayed as a vertical bar connected to the steering assistance unit and configured to indicate the current steering of the vehicle.

2. The driving assistance apparatus of claim 1, wherein the HUD is configured to display light around the outside of the virtual steering wheel in response to the steering guide unit matching with the target steering of the steering assistance unit.

3. The driving assistance apparatus of claim 1, wherein the HUD is configured to display a color of the steering assistance unit connected to the steering guide unit on the steering guide unit.

4. The driving assistance apparatus of claim 1, wherein the control unit is configured to determine a target parking space of the vehicle using the searching information and to calculate the target trajectory of the vehicle.

5. The driving assistance apparatus of claim 1, wherein the control unit is configured to calculate a non-collision trajectory of the vehicle in a driving situation using the searching information and to calculate the target trajectory of the vehicle.

6. The driving assistance apparatus of claim 1, wherein the control unit is configured to continuously display the expected trajectory of the vehicle according to a change of the steering angle of the steering device.

7. A driving assistance method comprising:
   searching surroundings of a vehicle using one or more sensors to generate searching information;
   calculating a target trajectory of the vehicle using the searching information;
   calculating an expected trajectory of the vehicle based on a steering angle of a steering device; and
   displaying the target trajectory and the expected trajectory on a head-up display (HUD), the displaying designed to assist steering by a driver, wherein the displaying comprises displaying a virtual steering wheel, a steering assistance unit displayed outside of the virtual steering wheel as a gradient bar to visually guide from current steering to target steering of the vehicle in order to guide the vehicle along the target trajectory from the current steering of the vehicle, and a steering guide unit displayed as a vertical bar connected to the steering assistance unit to indicate the current steering of the vehicle.

8. The driving assistance method of claim 7, further comprising displaying light around the outside of the virtual steering wheel in response to the steering guide unit matching with the target steering of the steering assistance unit.

9. The driving assistance method of claim 7, further comprising displaying a color of the steering assistance unit connected to the steering guide unit on the steering guide unit.

10. The driving assistance method of claim 7, wherein calculating the target trajectory of the vehicle comprises determining a target parking space of the vehicle using the searching information to calculate the target trajectory of the vehicle.

11. The driving assistance method of claim 7, wherein calculating the target trajectory of the vehicle comprises calculating a non-collision trajectory of the vehicle in a driving situation using the searching information to calculate the target trajectory of the vehicle.

12. The driving assistance method of claim 7, wherein displaying the target trajectory and the expected trajectory for the driver comprises continuously displaying the expected trajectory of the vehicle according to a change of the steering angle of the steering device.

13. A driving assistance apparatus comprising:
- a sensor unit configured to search surroundings of a vehicle using one or more sensors, the sensor unit including a camera and an ultrasonic sensor;
- a steering device configured to control a traveling direction of the vehicle;
- a control unit configured to calculate a target trajectory of the vehicle using searching information received from the sensor unit and to calculate an expected trajectory of the vehicle based on a steering angle of the steering device; and
- a head-up display (HUD) configured to display the target trajectory and the expected trajectory for a driver, the display designed to assist a steering operation of the driver, wherein the HUD comprises:
- a virtual steering wheel;
- a steering assistance unit displayed outside of the virtual steering wheel and configured as a gradient bar to visually guide from current steering to target steering of the vehicle in order to guide the vehicle along the target trajectory from the current steering of the vehicle; and
- a steering guide unit displayed as a vertical bar connected to the steering assistance unit and configured to indicate the current steering of the vehicle.

14. The driving assistance apparatus of claim 13, wherein the HUD is configured to display light around the outside of the virtual steering wheel in response to the steering guide unit matching with the target steering of the steering assistance unit.

15. The driving assistance apparatus of claim 13, wherein the HUD is configured to display a color of the steering assistance unit connected to the steering guide unit on the steering guide unit.

16. The driving assistance apparatus of claim 13, wherein the control unit is configured to determine a target parking space of the vehicle using the searching information and to calculate the target trajectory of the vehicle.

17. The driving assistance apparatus of claim 13, wherein the control unit is configured to calculate a non-collision trajectory of the vehicle in a driving situation using the searching information and to calculate the target trajectory of the vehicle.

18. The driving assistance apparatus of claim 13, wherein the control unit is configured to continuously display the expected trajectory of the vehicle according to a change of the steering angle of the steering device.

* * * * *